US012281519B2

(12) United States Patent
Rose et al.

(10) Patent No.: US 12,281,519 B2
(45) Date of Patent: Apr. 22, 2025

(54) BRACKET AND HEADRAIL COUPLING SYSTEM

(71) Applicant: Hunter Douglas Inc., New York, NY (US)

(72) Inventors: Randy Rose, Charlotte, NC (US); Nickolas C. Buccola, Jr., Gastonia, NC (US)

(73) Assignee: Hunter Douglas Inc., New York, NY (US)

( * ) Notice: Subject to any disclaimer, the term of this patent is extended or adjusted under 35 U.S.C. 154(b) by 162 days.

(21) Appl. No.: 18/027,551

(22) PCT Filed: Oct. 4, 2021

(86) PCT No.: PCT/US2021/053314
§ 371 (c)(1),
(2) Date: Mar. 21, 2023

(87) PCT Pub. No.: WO2022/076282
PCT Pub. Date: Apr. 14, 2022

(65) Prior Publication Data

US 2023/0399890 A1 Dec. 14, 2023

Related U.S. Application Data

(60) Provisional application No. 63/088,508, filed on Oct. 7, 2020.

(51) Int. Cl.
*E06B 9/32* (2006.01)
*E06B 9/323* (2006.01)

(52) U.S. Cl.
CPC .................................... *E06B 9/323* (2013.01)

(58) Field of Classification Search
CPC ... E06B 9/323; E06B 9/30; E06B 9/32; A47H 1/14
See application file for complete search history.

(56) References Cited

U.S. PATENT DOCUMENTS 4,949,926 A * 8/1990 Liu ......................... E06B 9/323 160/902
5,060,710 A * 10/1991 Haarer ................... A47H 1/144 160/902

(Continued)

FOREIGN PATENT DOCUMENTS

EP 1624149 A2 2/2006

OTHER PUBLICATIONS

International Search Report and Written Opinion for the International Patent Application No. PCT/US2021/053314, mailed Jan. 27, 2022, 10 pages.

*Primary Examiner* — Beth A Stephan
(74) *Attorney, Agent, or Firm* — KDW Firm PLLC

(57) ABSTRACT

A coupling or bracket system arranged and configured to couple a headrail or cassette of an architectural-structure covering one or more brackets mounted to a wall is disclosed. In use, the brackets are arranged and configured to receive the headrail in a purely horizontal motion with little to no vertical or rotational motion. Thus arranged, the coupling or bracket system eliminates the need for the headrail to be rotated into position during installation. Thus arranged, the coupling or bracket system eliminates, or at least minimizes, the concerns about the distance or spacing between the brackets and the ceiling.

24 Claims, 13 Drawing Sheets

(56) References Cited

U.S. PATENT DOCUMENTS

| | | | | | |
|---|---|---|---|---|---|
| 5,186,426 | A * | 2/1993 | Wada | E06B 9/323 248/265 |
| 5,230,493 | A * | 7/1993 | Luoto | E06B 9/323 248/254 |
| 5,353,857 | A * | 10/1994 | Anderson | E06B 9/323 160/902 |
| 5,533,560 | A * | 7/1996 | Morris | E06B 9/323 160/902 |
| 6,186,457 | B1 * | 2/2001 | Carter | E06B 9/323 248/254 |
| 6,293,330 | B1 * | 9/2001 | Ciuca | E06B 9/323 160/176.1 R |
| 6,322,029 | B1 * | 11/2001 | Sonnenberg | E06B 9/323 248/261 |
| 6,382,296 | B1 | 5/2002 | Judkins | |
| 6,981,539 | B2 * | 1/2006 | Fraczek | E06B 9/322 160/84.05 |
| 7,048,028 | B2 * | 5/2006 | Wolfe | E06B 9/266 248/261 |
| 7,284,736 | B2 * | 10/2007 | Franssen | E06B 9/266 248/220.21 |
| 2017/0058598 | A1 * | 3/2017 | Chang | E06B 9/307 |
| 2019/0053654 | A1 * | 2/2019 | Chang | A47H 1/14 |
| 2021/0047884 | A1 * | 2/2021 | Kirby | E06B 9/68 |
| 2021/0330112 | A1 * | 10/2021 | Hanley | E06B 9/323 |
| 2023/0119373 | A1 * | 4/2023 | Chou | E06B 9/323 29/24.5 |

* cited by examiner

BRACKET AND HEADRAIL COUPLING SYSTEM

CROSS-REFERENCE TO RELATED APPLICATIONS

This application is a National Phase filing of International Application No. PCT/US2021/053314, filed Oct. 4, 2021, which is a non-provisional of, and claims the benefit of the filing date of, U.S. Provisional Patent Application No. 63/088,508, filed Oct. 7, 2020, entitled "Bracket for Coupling A Cassette/Headrail of an Architectural-Structure Covering to an Underlying Architecture Structure", the entirety of each application is incorporated by reference herein.

FIELD OF THE DISCLOSURE

The present disclosure relates generally to the field of architectural-structure coverings, and relates more particularly to an improved coupling or bracket system for coupling a cassette or headrail of an architectural-structure covering to an underlying architecture structure.

BACKGROUND

Architectural-structure coverings may selectively cover an architectural structure such as, for example, a window, a doorway, a skylight, a hallway, or a portion of a wall. Architectural-structure coverings may include a covering that can be extendable and retractable, for example, vertically extendable or retractable (e.g., able to be lowered or raised, respectively, in a vertical direction) relative to a horizontally-oriented headrail or cassette (terms used interchangeably herein without the intent to limit) between an extended position and a retracted position for obscuring and exposing the underlying architectural structure.

For example, referring to FIG. 1, a front view of an architectural-structure covering 100 is illustrated. As shown, the architectural-structure covering 100 includes a headrail 108, which in the illustrated embodiment is a housing having opposed end caps 110, 112 joined by front, back, and top sides to form an open bottom enclosure. The end caps 110, 112 may enclose the ends of the headrail 108 to provide a finished appearance and provide structural support for the components of the architectural-structure covering 100. The headrail 108 may include brackets or mounts 114 (terms used interchangeably herein without the intent to limit) for mounting the architectural-structure covering 100 to a wall or other underlying structure. Although a particular example of a headrail 108 is shown in FIG. 1, many different types and styles of headrails exist and could be employed in place of the example headrail of FIG. 1.

In the embodiment shown in FIG. 1, the architectural-structure covering 100 also includes a rotatable member (e.g., a roller) 104 rotatably coupled between the end caps 110, 112, and coupled to a covering 106. In the illustrated example, the covering 106 has an upper edge or portion 117 coupled to the rotatable member 104 and a lower, free edge 119. As will be readily appreciated by one of ordinary skill in the art, the covering 106 of the architectural-structure covering 100 may be suspended from the rotatable member 104 and may be configured to be vertically extended and retracted relative to the headrail 108 between the extended position (shown in FIG. 1), wherein the covering 106 may partially or entirely cover an architectural structure and a retracted position, wherein the covering 106 may be retracted relative to the rotatable member 104. For example, rotation of the rotatable member 104 in a first direction (e.g., counter-clockwise direction in FIG. 1) may retract the covering 106 while rotation of the rotatable member 104 in a second, opposite direction (e.g., clockwise direction in FIG. 1) may extend the covering 106. The covering 106 may be coupled to and wrappable about the rotatable member 104, so that rotation of the rotatable member 104 causes the covering 106 to wrap around or unwrap from the rotatable member 104 depending upon the direction of rotation. Although not shown, any suitable drive mechanism now known or hereafter developed can be provided to move the covering 106 between the extended and retracted positions.

In use, the covering 106 may be constructed of any of a variety of different types of material. For example, the covering 106 may be constructed from natural and/or synthetic materials, including fabrics, polymers, and/or other suitable materials. Fabric materials may include woven, non-woven, knits, or other suitable fabric types. The covering 106 may have any suitable level of light transmissivity. For example, the covering 106 may be constructed of transparent, translucent, and/or opaque materials to provide a desired ambience or decor in an associated room.

In use, the headrail 108 is selectively coupled and decoupled from the brackets 114. For example, during installation, the brackets 114 may be initially coupled to the wall or other structure of an end user's building. Subsequently, the headrail 108 may be coupled to the brackets 114 thereby coupling the architectural-structure covering 100 to the wall or other structure of the end user's building.

Referring to FIG. 2, one known example of a bracket 114 is illustrated. As illustrated, the bracket 114 includes a wall mounting segment 120 for coupling to the wall via, for example, one or more fasteners, and a headrail coupling segment 130 extending therefrom. As illustrated, the bracket 114 may be integrally or monolithically formed, although such is not necessary. In use, the bracket 114 includes one or more coupling mechanisms or methods for coupling to the headrail 108 such as, for example, interlocking hooks/projections and recesses.

One disadvantage of such conventional brackets 114 is that in order to couple the headrail 108 to the brackets 114, the headrail 108 must be rotated into position. For example, as generally illustrated in FIG. 2, the headrail 108 is rotated into position relative to the bracket 114 so that a projection 142 extending from a top surface 140 of the headrail 108 engages a hook 132 formed on the headrail coupling segment 130 of the bracket 114. Thereafter, the bracket 114 is rotated until a second projection 144 formed on the headrail 108 engages a second recess 122 formed on the wall mounting segment 120 of the bracket 114. That is, the design of the bracket 114 requires that the headrail 108 be rotationally oriented to attach to the front hook and then rotated back into engagement with a lower spring tab.

One disadvantage of this coupling system is that for wall mounted applications where a limited or reduced amount of space or distance is provided between the desired positioning of the brackets 114 and, for example, a ceiling, installation via such rotational movement may be difficult.

One solution to overcome this problem is for the headrail 108 to incorporate a curved or arcuate surface (e.g., a chamfer) 145 in the top surface 140 of the headrail 108. For example, as illustrated, the top surface 140 of the headrail 108 may include a curved top surface or segment (e.g., a chamfer) 145 adjacent to or extending from a front surface 146 of the headrail 108. By incorporating a curved surface or segment (e.g., a chamfer) 145 in the top surface 140 of the headrail 108, adjacent to the front surface 146, increased spacing between the headrail 108 and the ceiling is provided, and thus rotational engagement of the headrail 108 to the bracket 114 can be achieved.

However, one disadvantage of curving the top surface 140 of the headrail 108, or at least a portion thereof, is that such curving reduces the available space within an interior cavity 150 of the headrail 108. That is, the initial orientation for coupling limits the geometry of the headrail 108 requiring a chamfer 145 on the top surface 140 thereof.

Thus, it would be beneficial to provide an improved coupling system (e.g., bracket) that overcomes these challenges. It is with respect to these and other considerations that the present improvements may be useful.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

An improved coupling or bracket system is disclosed. In accordance with one or more features of the present disclosure, the coupling or bracket system is arranged and configured to enable a headrail or cassette of an architectural-structure covering to be horizontally coupled to one or more brackets mounted to a wall (e.g., the headrail is coupled to the brackets in a substantially horizontal motion with little to no vertical or rotational motion). Thus arranged, the coupling or bracket system eliminates the need for the headrail to be rotated into position during installation. Moreover, the coupling or bracket system eliminates, or at least minimizes, the concerns about the distance or spacing between the brackets and the ceiling. As such, the coupling or bracket system eliminates the need for the headrail to include a curved (e.g., chamfer) top surface to facilitate installation.

In one embodiment, a bracket arranged and configured to couple a headrail of an architectural-structure covering to a wall is disclosed. In one embodiment, the bracket includes a wall mounting segment and a headrail coupling segment extending from the wall mounting segment. The wall mounting segment including a rear wall arranged and configured to contact the wall and one or more shelves extending from the wall mounting segment, the one or more shelves being arranged and configured to be received within a pocket of the headrail to align and support the headrail to the bracket. The headrail coupling segment including a downwardly extending tab positioned at an end of the headrail coupling segment, the tab being arranged and configured to be received within an opening of the headrail; a resiliently movable member (e.g., a spring latch) movable between a first position and a second position, in the first position, at least a portion of the spring latch is positioned within a recess of the headrail for securing the headrail to the bracket, in the second position, the portion of the spring latch is decoupled from the headrail so that the headrail can be removed from the bracket; and a spring tab latch moveable from a first position to a second position such that movement of the spring tab latch from the first position to the second position moves the spring latch from its first position to its second position; wherein the one or more shelves and the tab are arranged and configured to be received within the pocket and the opening, respectively, in a substantially horizontal motion.

In one embodiment, the portion of the spring latch is a bump arranged and configured to reside within the recess, the recess formed in a first, rearwardly extending arm on the headrail.

In one embodiment, the bracket is monolithically formed with the headrail coupling segment extending at an approximate 90-degree angle relative to the wall mounting segment.

In one embodiment, the one or more shelves include first and second shelves.

In one embodiment, the spring tab latch further comprises a groove formed in a front surface thereof, the groove adapted and configured to receive an end portion of the spring tab.

In one embodiment, the spring latch is arranged and configured as a leaf-spring arranged and configured to flex between the first and second positions thereof.

In one embodiment, the spring tab latch is slidably movable from the first position to the second position.

In one embodiment, the wall mounting segment includes a pair of guides extending from a front surface thereof for slidably engaging the spring tab latch.

In one embodiment, the spring tab latch includes a tab extending from a front surface thereof, the tab being arranged and configured to maintain the spring tab latch in the second position.

In one embodiment, the tab extending from the spring tab latch is arranged and configured to interact with a second, rearwardly extending ledge of the headrail.

In one embodiment, the headrail mounting segment includes one or more assembly slots formed therein, the assembly slots being arranged and configured to receive one or more fasteners for coupling a battery pack to the bracket.

In one embodiment, a coupling system arranged and configured to couple a headrail of an architectural-structure covering to a wall is disclosed. The coupling system including a headrail and a bracket. The headrail includes a rear surface, a front surface, and a top surface extending between the rear and front surfaces, the top surface of the headrail includes a first leg partially defining an opening, the rear surface including a pocket, and a first, rearwardly extending arm including a recess. The bracket includes a wall mounting segment and a headrail coupling segment extending from the wall mounting segment. The wall mounting segment includes a rear wall arranged and configured to contact the wall and one or more shelves extending from the wall mounting segment, the one or more shelves being arranged and configured to be received within the pocket of the headrail to align and support the headrail to the bracket. The headrail coupling segment including a downwardly extending tab positioned at an end of the headrail coupling segment, the tab being arranged and configured to be received within the opening of the headrail; a resiliently movable member (e.g., a spring latch) movable between a first position and a second position, in the first position, at least a portion of the spring latch is positioned within the recess of the headrail for securing the headrail to the bracket, in the second position, the portion of the spring latch is decoupled from the headrail so that the headrail can be removed from the bracket; and a spring tab latch moveable from a first position to a second position such that movement of the spring tab latch from the first position to the second position moves the spring latch from its first position to its second position; wherein the one or more shelves and the tab are arranged and configured to be received within the pocket and the opening, respectively, in a substantially horizontal motion.

In one embodiment, the portion of the spring latch is a bump arranged and configured to reside within the recess.

In one embodiment, the bracket is monolithically formed with the headrail coupling segment extending at an approximate 90-degree angle relative to the wall mounting segment.

In one embodiment, the one or more shelves include first and second shelves.

In one embodiment, the spring tab latch further comprises a groove formed in a front surface thereof, the groove adapted and configured to receive an end portion of the spring tab.

In one embodiment, the spring latch is arranged and configured as a leaf-spring arranged and configured to flex between the first and second positions thereof.

In one embodiment, the spring tab latch is slidably movable from the first position to the second position.

In one embodiment, the wall mounting segment includes a pair of guides extending from a front surface thereof for slidably engaging the spring tab latch.

In one embodiment, the spring tab latch includes a tab extending from a front surface thereof, the tab being arranged and configured to maintain the spring tab latch in the second position.

In one embodiment, the headrail includes a second, rearwardly extending ledge, the tab extending from the spring tab latch is arranged and configured to interact with the second, rearwardly extending ledge of the headrail.

In one embodiment, the headrail mounting segment includes one or more assembly slots formed therein, the assembly slots being arranged and configured to receive one or more fasteners for coupling a battery pack to the bracket.

In one embodiment, the first leg includes a first leg segment extending from the top surface of the headrail and a second leg segment extending from the first leg segment, the second leg segment and the top surface of the headrail defining the opening.

In one embodiment, the second leg segment extends at an approximate 90-degree angle relative to the first leg segment so that the second leg segment extends substantially parallel to the top surface of the headrail.

DETAILED DESCRIPTION

Figure 1:
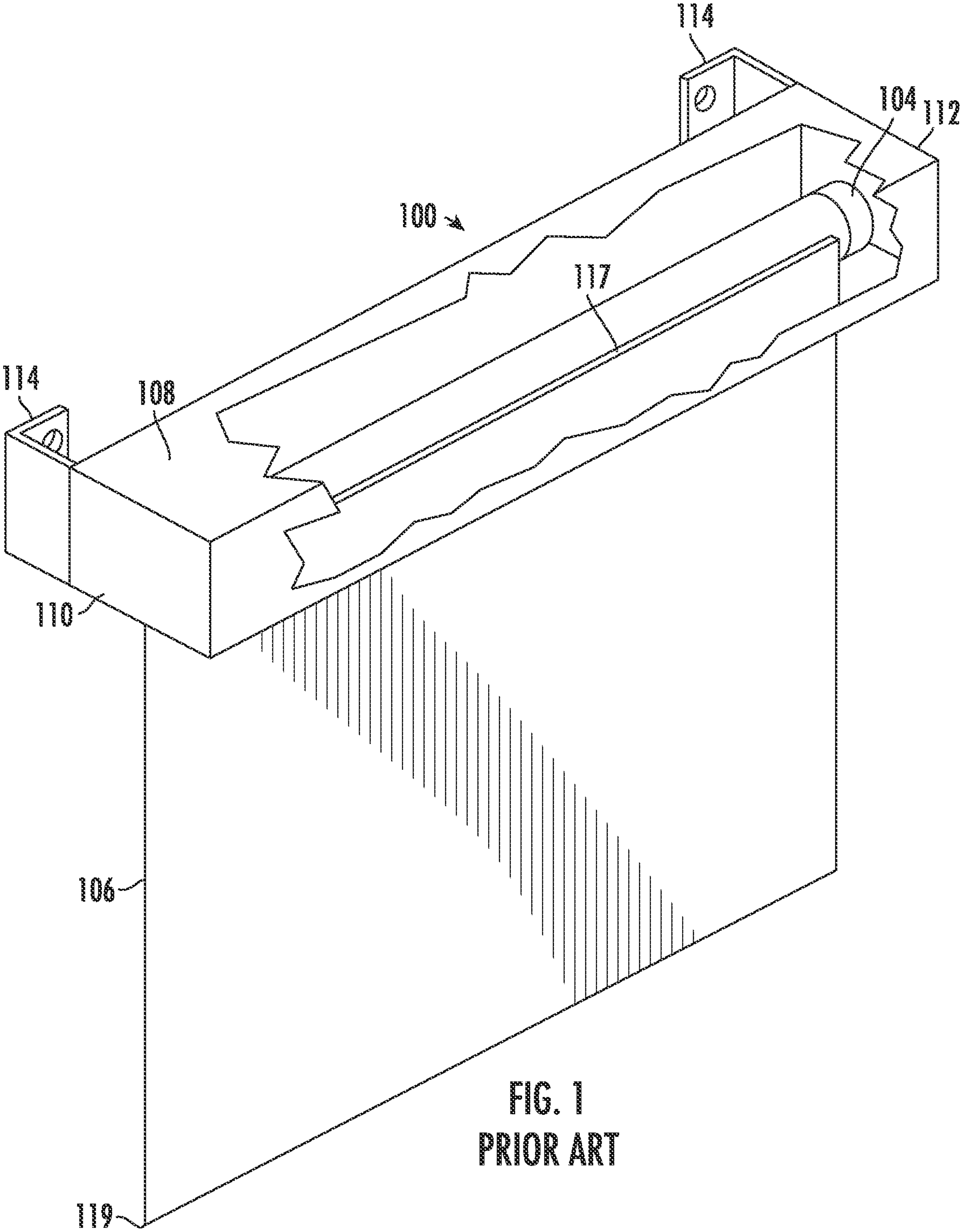
FIG. 1 PRIOR ART
FIG. 1 illustrates a front perspective view illustrating an embodiment of a known architectural-structure covering including a headrail, brackets or mounts, and a covering shown in an extended position.
Figure 2:
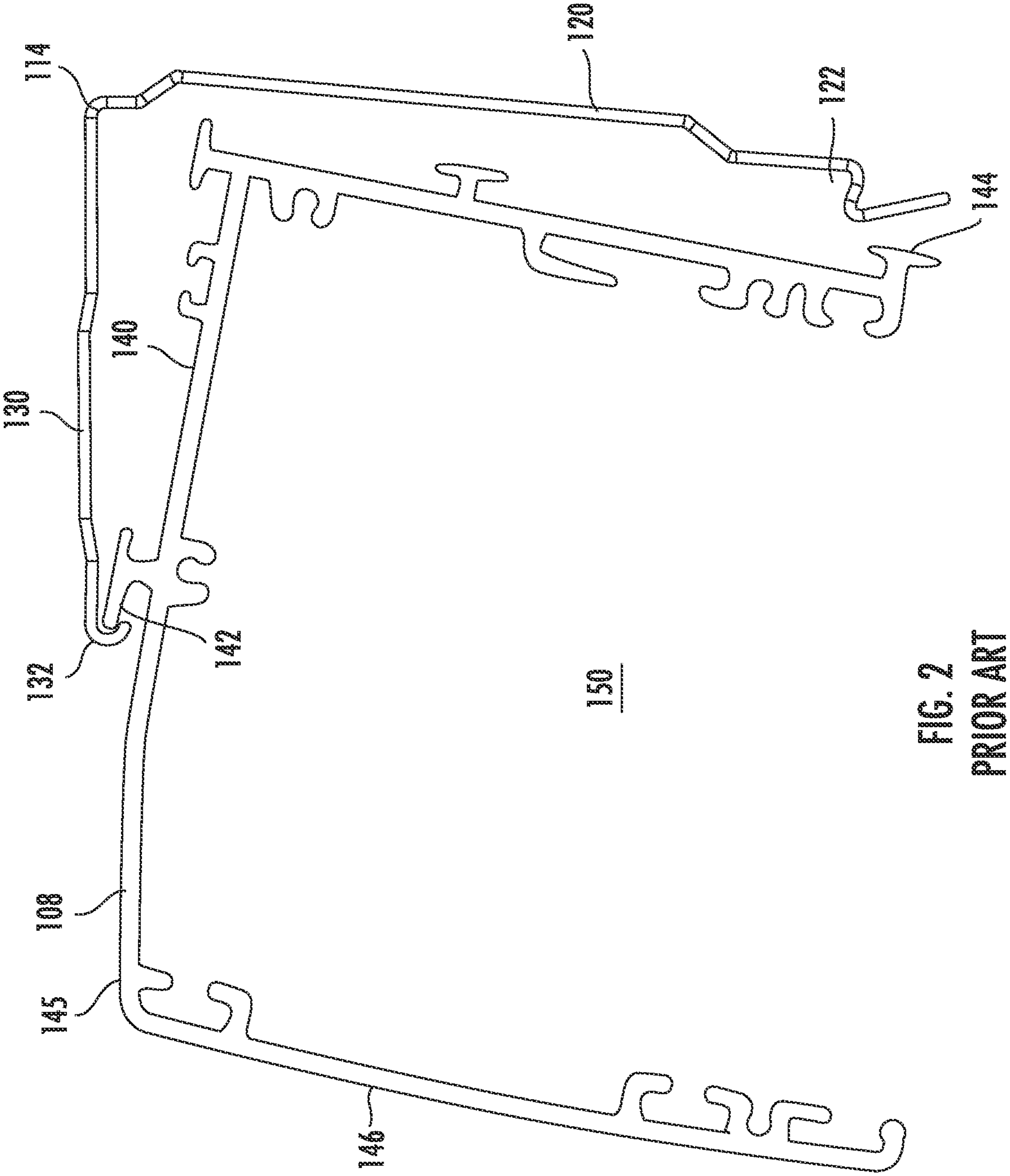
FIG. 2 PRIOR ART
FIG. 2 illustrates a cross-sectional view illustrating a known headrail and bracket system for coupling the headrail, and hence the architectural-structure covering, to a wall of a user' building.
Figure 3:
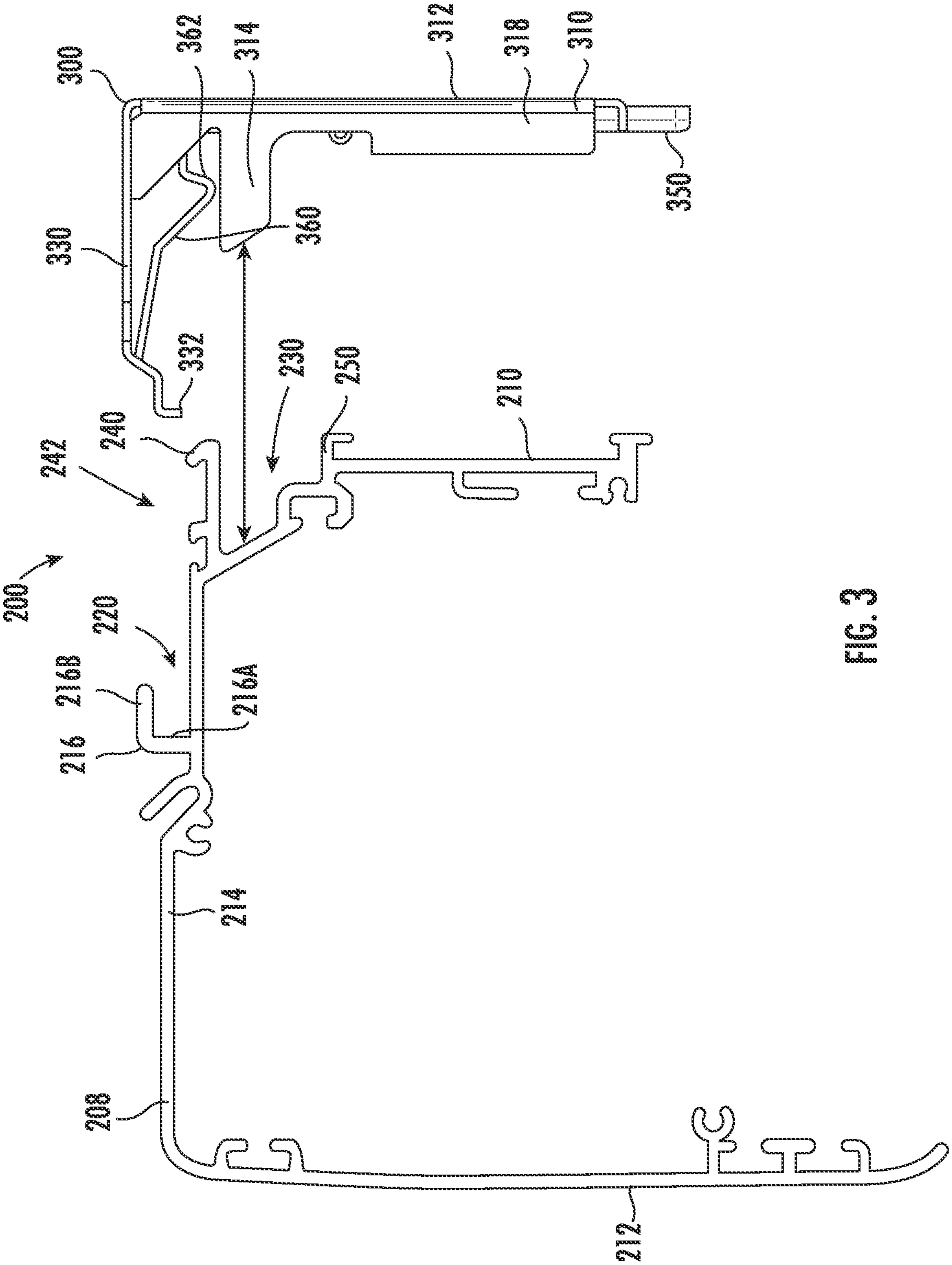
FIG. 3 illustrates an exploded side view of an embodiment of a coupling or bracket system for coupling a headrail, and hence an architectural-structure covering, to a wall of a user's building in accordance with one or more features of the present disclosure.
Figure 4:
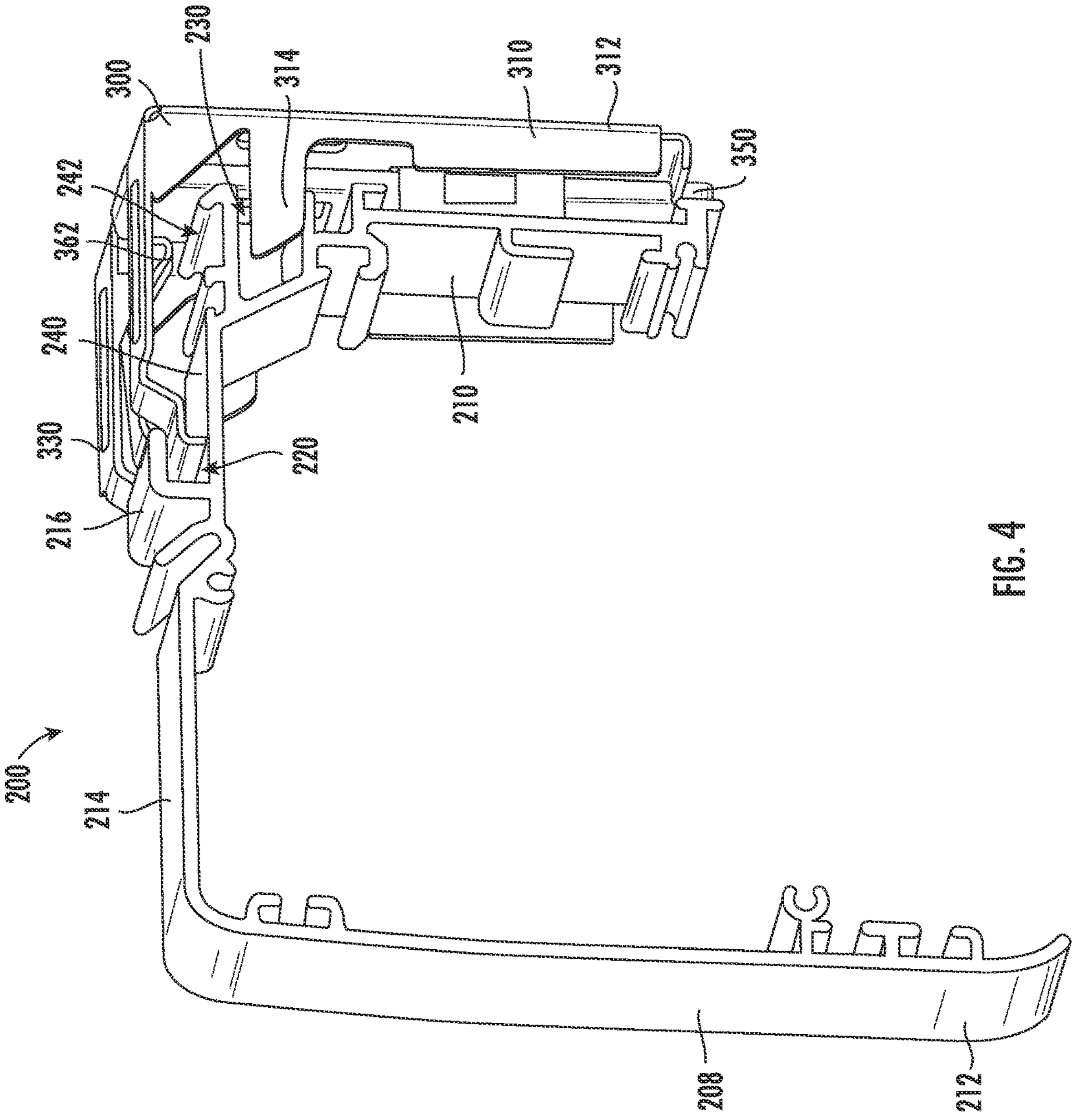
FIG. 4 illustrates a perspective, cross-sectional view of the coupling or bracket system shown in FIG. 3.
Figure 5:
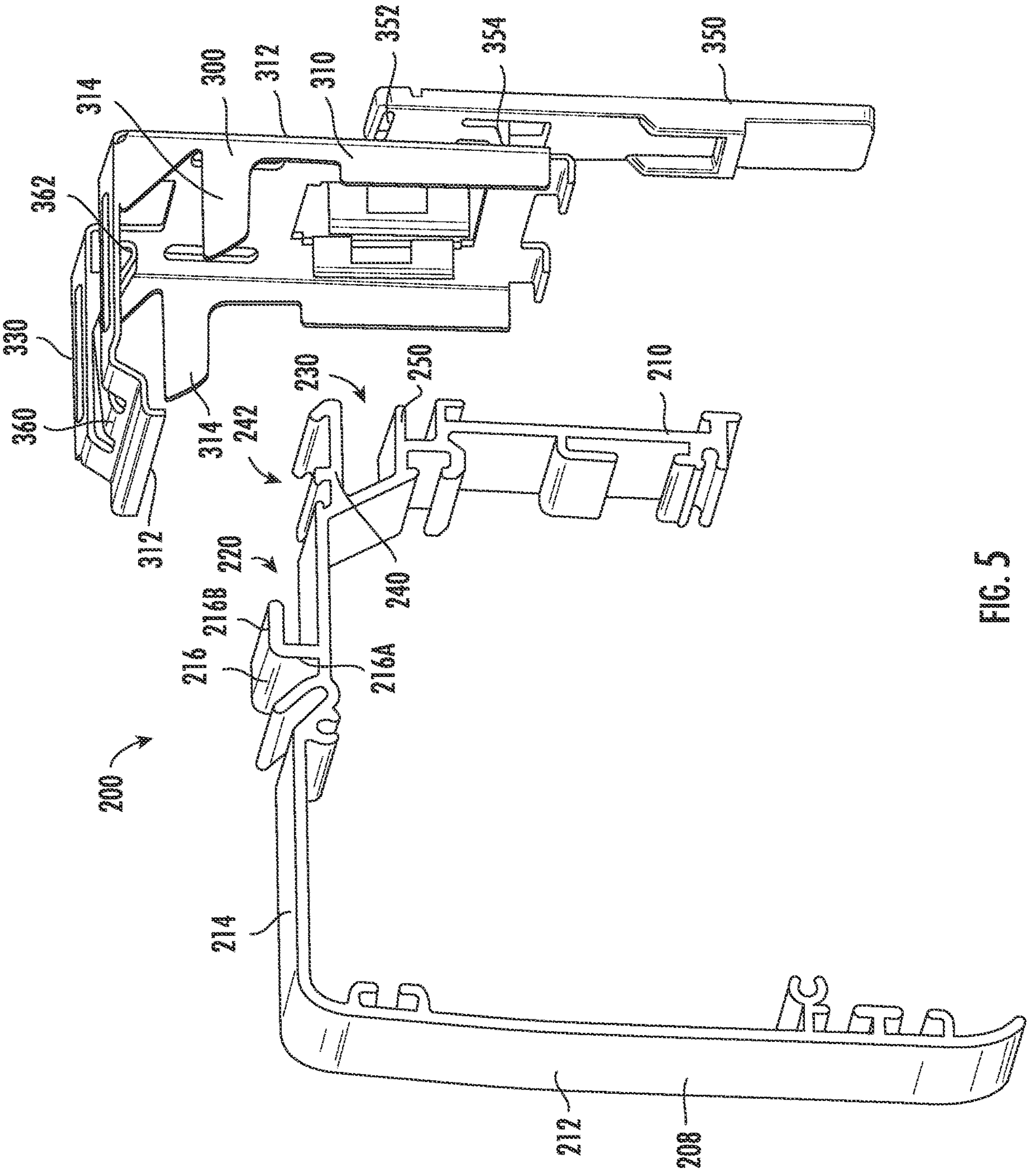
FIG. 5 illustrates an exploded view of the coupling or bracket system shown in FIG. 3.

Embodiments of an example, illustrative coupling or bracket system or mechanism for use in coupling a headrail of an architectural-structure covering to a wall in accordance with various separate and independent principles of the present disclosure will now be described more fully hereinafter with reference to the accompanying drawings, in which embodiments of the present disclosure are presented. The coupling or bracket system of the present disclosure may, however, be embodied in many different forms and should not be construed as being limited to the embodiments set forth herein. Rather, these embodiments are provided so that this disclosure will convey certain features of the coupling or bracket system to those skilled in the art. In the drawings, like numbers refer to like elements throughout unless otherwise noted.

In accordance with one or more features of the present disclosure, an improved coupling or bracket system is disclosed. In use, the coupling or bracket system is arranged and configured to enable the headrail of an architectural-structure covering to be horizontally coupled to one or more brackets mounted to a wall (e.g., the headrail is coupled to the brackets in a purely horizontal motion with little to no vertical or rotational motion). Thus arranged, the coupling or bracket system eliminates the need for the headrail to be rotated into position during installation. Thus arranged, the coupling or bracket system eliminates, or at least minimizes, the concerns about the distance or spacing between the brackets and the ceiling. As such, the coupling or bracket system eliminates the need for the headrail to include a curved (e.g., chamfer) top surface to facilitate installation. That is, as illustrated, in accordance with one or more features of the present disclosure, the bracket is arranged and configured to receive the headrail in a single horizontal direction or motion thus enabling the headrail to be substantially square.

Referring to FIGS. 3-8, an embodiment of a coupling or bracket system 200 in accordance with one or more features of the present disclosure is illustrated. In use, the coupling or bracket system 200 includes one or more brackets 300 arranged and configured to couple a headrail 208 of an architectural-structure covering such as, for example, architectural-structure covering 100, to a wall or other structure of an end-user's building. Generally speaking, as will be appreciated by one of ordinary skill in the art, a plurality of brackets 300 may be spaced longitudinally along a wall of an end-user's building, the plurality of brackets 300 being arranged and configured to receive and secure the headrail 208, and hence the architectural-structure covering, to the wall.

As shown, the headrail 208 includes a rear surface 210, a front surface 212, and a top surface 214 extending between the rear and front surfaces 210, 212, although this is but one configuration and the headrail may have other configurations. In one embodiment, as illustrated, the top surface 214 of the headrail 208 may include a first leg 216. In use, the first leg 216 may include a first leg segment 216A extending from the top surface 214 of the headrail 208 and a second leg segment 216B extending from the first leg segment 216A. For example, as illustrated, in one embodiment, the second leg segment 216B may extend at an approximate 90-degree angle relative to the first leg segment 216A so that the second leg segment 216B extends substantially parallel to the top surface 214 of the headrail 208, although other configurations are envisioned. In addition, and/or alternatively, the first and second leg segments 216A, 216B may be integrally or monolithically formed with each other and/or the headrail 208, although such is not necessary. As will be described in greater detail below, in use, the first leg 216 defines an opening or recess 220 along with the top surface 214 of the headrail 208, the opening or recess 220 arranged and configured to receive a portion of the bracket 300.

In addition, and/or alternatively, in one embodiment, the rear surface 210 of the headrail 208 may include a recess or pocket 230 formed therein. As will be described in greater detail below, in use, the pocket 230 is arranged and configured to receive a shelf 314 extending from the bracket 300. In use, the intercoupled pocket 230 and shelf 314 help align and support the headrail 208 to the bracket 300.

In addition, and/or alternatively, as will be described in greater detail below, the headrail 208 may include a first, rearwardly extending ledge or arm 240 including a recess 242 for interacting with a projection or bump 362 formed on a resiliently movable member 360 such as, for example, a spring latch of the bracket 300. In addition, the headrail 208 may include a second, rearwardly extending ledge or arm 250 for interacting with a keeper tab 354 extending from a spring tab latch 350 of the bracket 300.

Referring to FIGS. 3-8, in one embodiment, the bracket 300 includes a wall mounting segment 310 having a rear wall 312 arranged and configured to contact a wall of an end-user's building. In use, the bracket 300 may be coupled to the wall utilizing one or more fasteners (not shown) positioned thru openings formed in the bracket 300. Thus arranged, the rear wall 312 may be mounted to the wall of an end-user's building.

In addition, the bracket 300 includes a headrail coupling segment 330 extending from the wall mounting segment 310. As illustrated, in one embodiment, the headrail coupling segment 330 extends from a top end of the wall mounting segment 310, although other configurations are envisioned. For example, as illustrated, in one embodiment, the headrail coupling segment 330 may extend at an approximate 90-degree angle relative to the wall mounting segment 310 so that the headrail coupling segment 330 extends substantially perpendicular to the wall of an end-user's building, although other configurations are envisioned.

In addition, as illustrated, the bracket 300 may be integrally or monolithically formed as a single piece, although it will be appreciated that the bracket can alternately be manufactured from multiple pieces that are coupled together. Moreover, as previously mentioned, the bracket 300 includes one or more shelves or projections 314 extending from the wall mounting segment 310. For example, as illustrated, the bracket 300 may include first and second shelves or projections 314, one on either side thereof, although other configurations are envisioned. In use, the one or more shelves or projections 314 are arranged and configured to be received within the pocket 230 formed in the headrail 208 for aligning and supporting the headrail 208 to the bracket 300.

In one embodiment, as illustrated and as previously mentioned, the headrail coupling segment 330 may include a tab or downwardly extending projection 332 formed at an end thereof, the tab 332 being arranged and configured for receipt within the opening or recess 220 formed by the leg 216 and the top surface 214 of the headrail 208. Thus arranged, in use, with one or more brackets 300 coupled to the wall of an end-user's building, the headrail 208 can be coupled to the brackets 300 using a horizontal motion with the tab 332 positioned within the opening or recess 220 formed by the leg 216 and the top surface 214 of the headrail 208 and with the one or more shelves 314 aligned within the pocket 230 of the headrail 208. That is, the headrail 208 can be coupled to the bracket 300, and hence the wall of an end-user's building, using purely horizontal motion with little to no vertical or rotational motion.

Figure 6A:
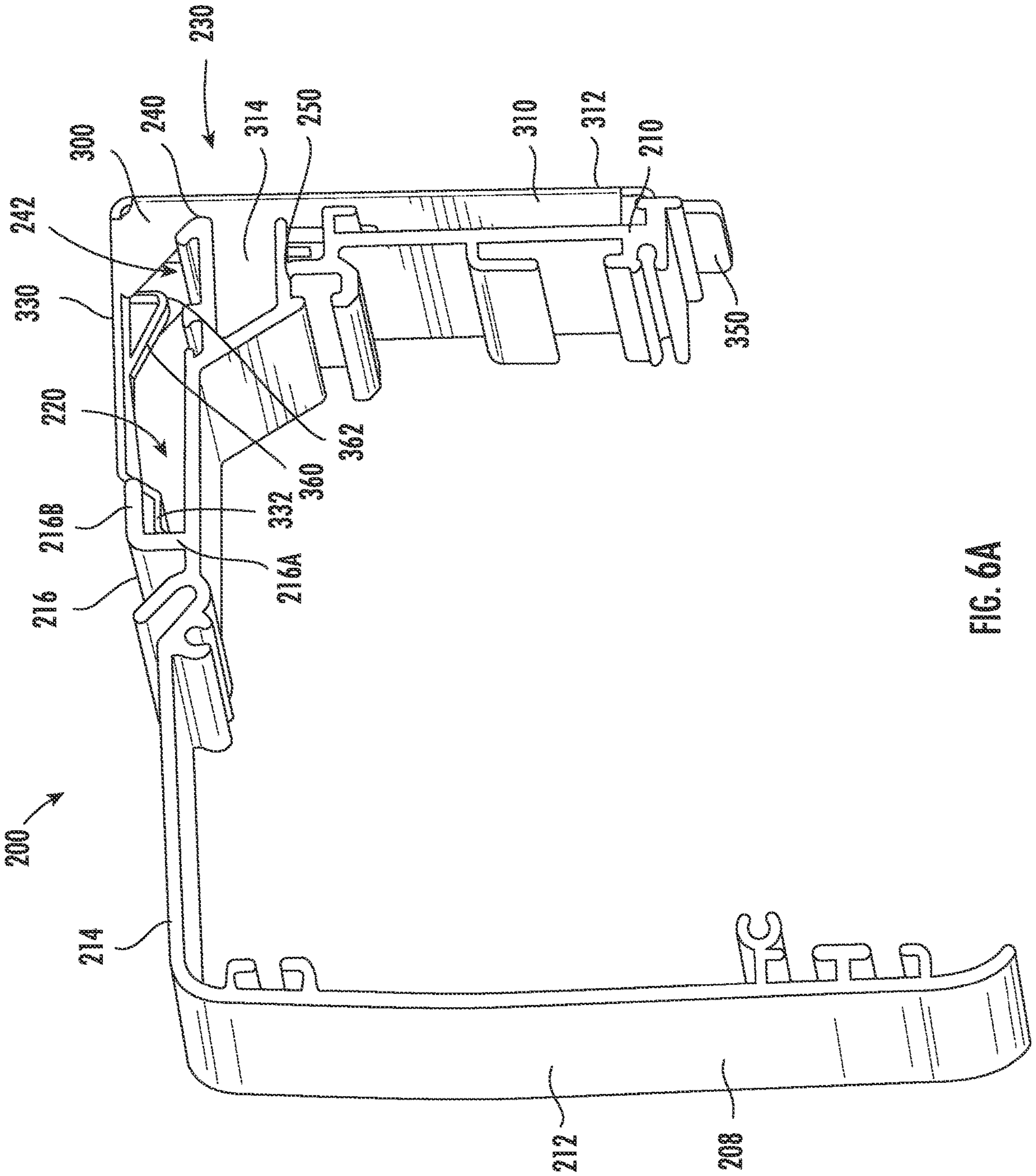
FIG. 6A illustrates an alternate cross-sectional view of the coupling or bracket system shown in FIG. 3, the spring tab latch and the spring latch shown in a first position.
Figure 6B:
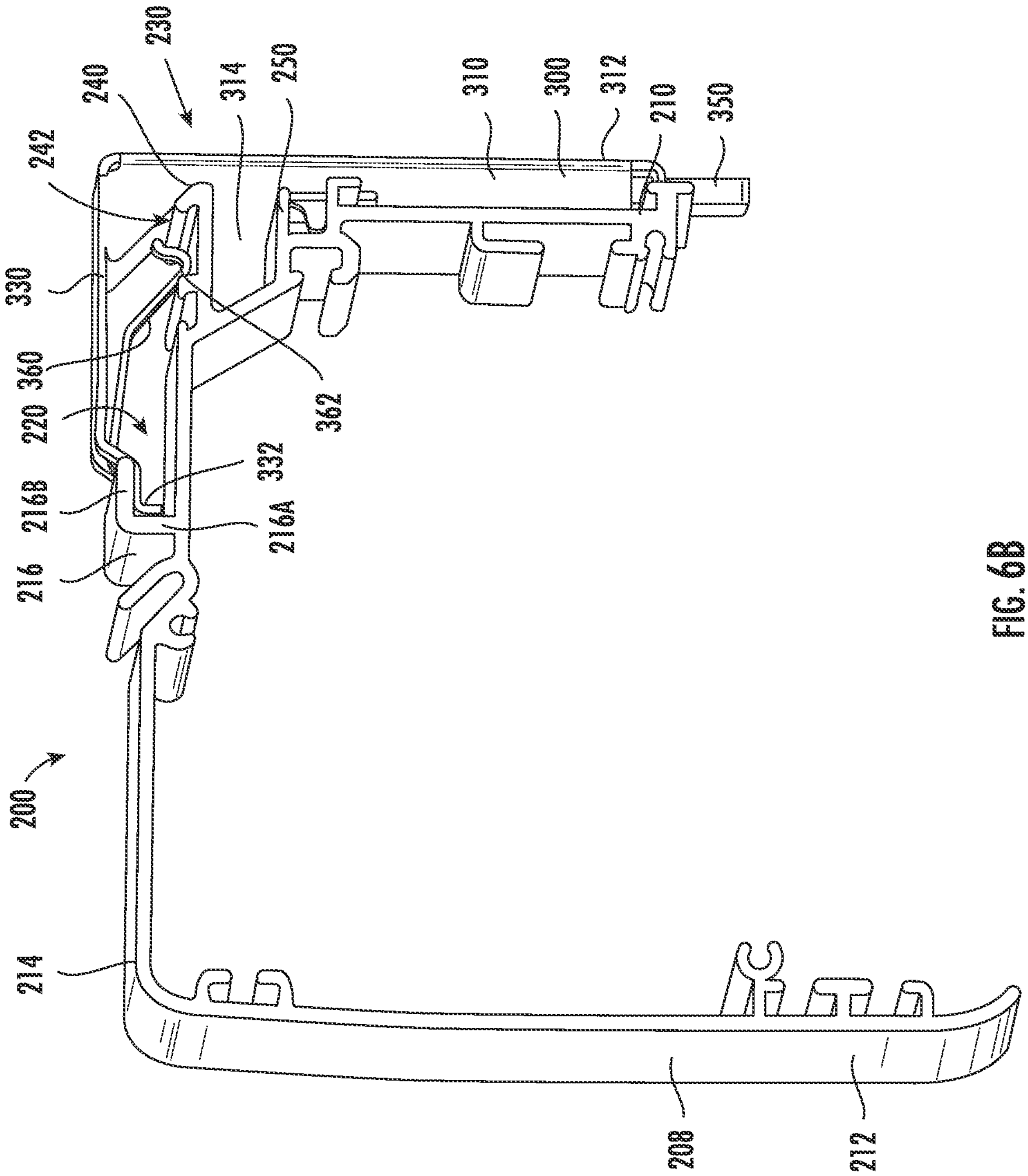
FIG. 6B illustrates an alternate cross-sectional view of the coupling or bracket system shown in FIG. 3, the spring tab latch and the spring latch shown in a second position.

As illustrated, the headrail coupling segment 330 may further include a resiliently movable member 360. In use, the resiliently movable member 360 may be provided in any suitable form such as, for example, a deflectable latch, a leaf spring, a living hinge, a coil spring, etc. In use, the resiliently movable member 360 is arranged and configured to move or flex from a first position (FIG. 6A) to a second position (FIG. 6B). For example, in one embodiment, the resiliently movable member 360 may be in the form of a spring biased latch. As such, the resiliently movable member 360 may be referred to herein as a spring latch 360 without the intent to limit or distinguish. In one embodiment, the spring latch 360 may be in the form of a leaf spring that is cut, formed, punched, etc. from the headrail coupling segment 330. In use, the spring latch 360 is arranged and configured to move or flex from a first position (FIG. 6A) to a second position (FIG. 6B). For example, the spring latch 360 may include a projection or bump 362 formed thereon. In the first position (FIG. 6A), the bump 362 may be arranged and configured to sit, reside, etc. within the recess 242 of the first, rearwardly extending ledge or arm 240 on the headrail 208 when the headrail 208 is coupled to the brackets 300.

In addition, as illustrated, the bracket 300 includes a moveable spring tab latch 350. In use, the spring tab latch 350 is movable from a first position (FIG. 6A) to a second position (FIG. 6B). Thus, with the headrail 308 coupled to the brackets 300, the spring tab latch 350 is located in the first position (FIG. 6A). In the first position (FIG. 6A), the tab 332 is positioned within the opening or recess 220 formed by the leg 216 and the top surface 214 of the headrail 208, the one or more shelves 314 are aligned within the pocket 230 of the headrail 208, and the bump 362 formed on the spring latch 360 is positioned within the recess 242 of the first, rearwardly extending ledge or arm 240 on the headrail 208. As such, the headrail 208 is firmly coupled to the brackets 300, and hence the wall of an end-user's building.

Thereafter, as needed, if the user desires to remove the headrail 208 from the brackets 300, and hence the wall of the end-user's building, the user can move (e.g., push, slide, etc.) the spring tab latch 350 from the first position (FIG. 6A) to the second position (FIG. 6B), which causes the spring tab latch 350 to move (e.g., flex) the spring latch 360, and more specifically, the bump 362 out of engagement with the recess 242 of the first, rearwardly extending ledge or arm 240 on the headrail 208. In this manner the headrail 208 can be selectively decoupled from the brackets 300. That is, moving the spring tab latch 350 from the first position (FIG. 6A) to the second position (FIG. 6B), causes the spring latch 360 to deflect, which enables the headrail 208 to be decoupled from the bracket 300.

Figure 7:
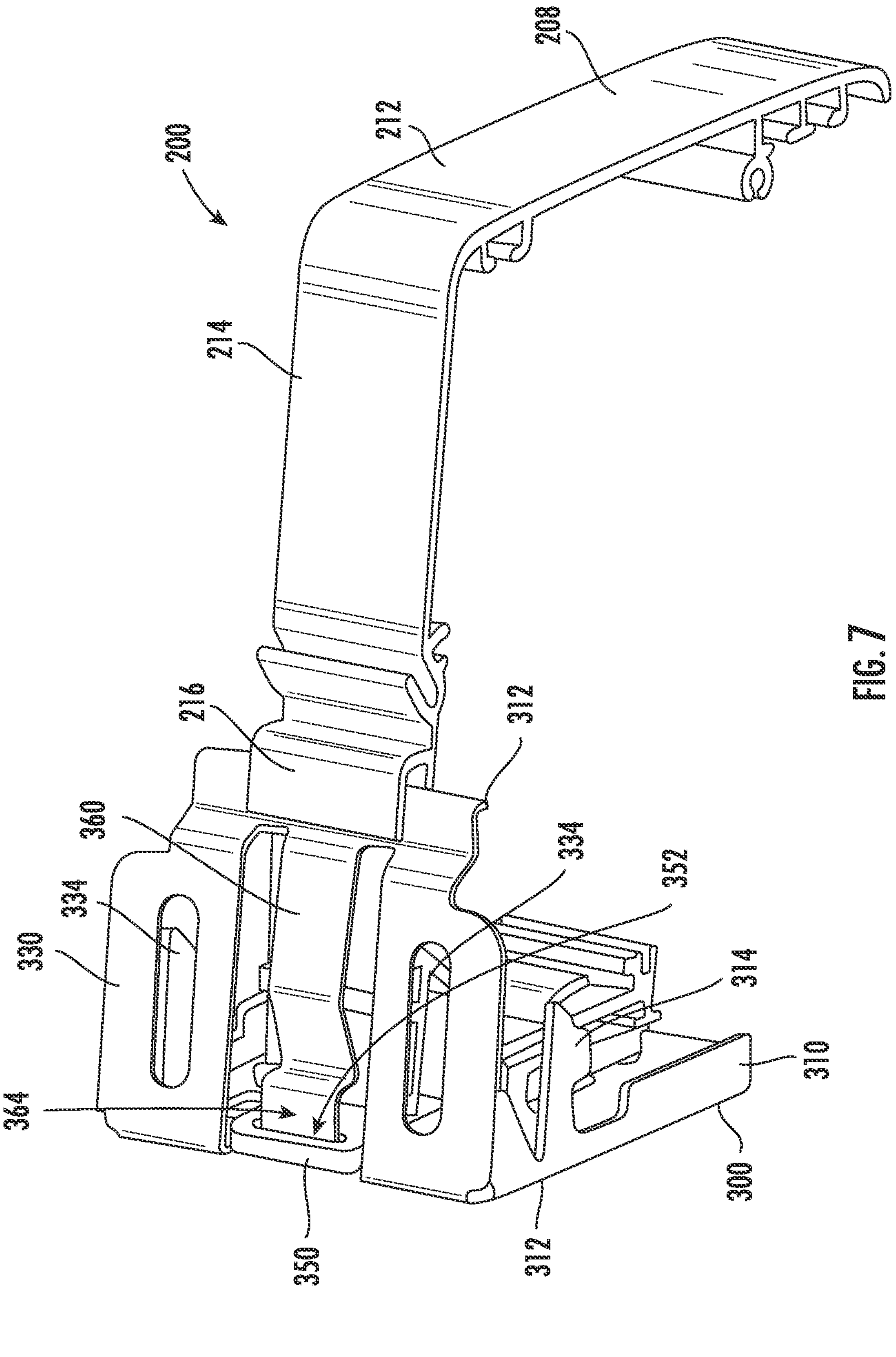
FIG. 7 illustrates a top perspective view of the coupling or bracket system shown in FIG. 3.
Figure 8:
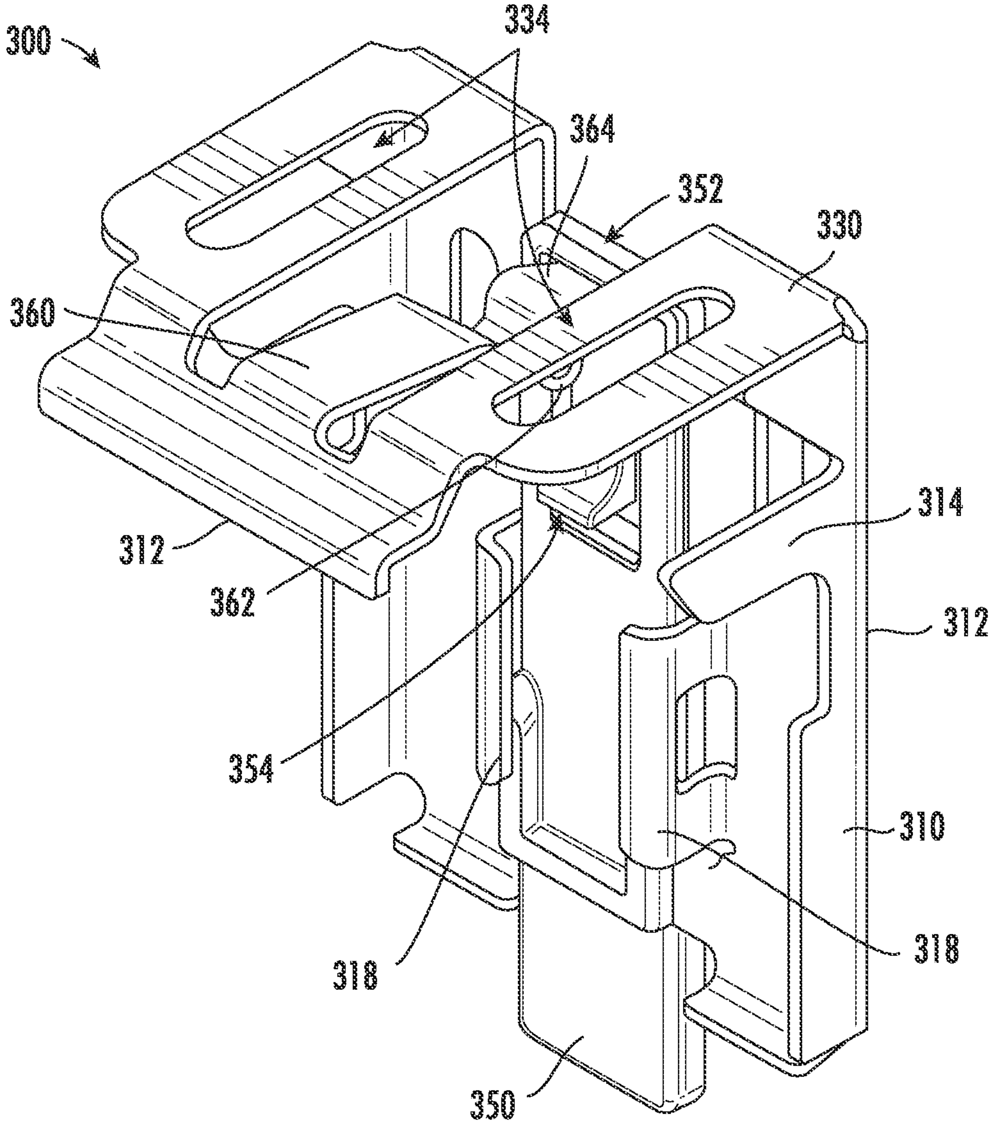
FIG. 8 illustrates a perspective view of an embodiment of a bracket of the coupling or bracket system shown in FIG. 3.

The spring tab latch 350 may contact or be coupled to the spring latch 360 by any suitable mechanism or method now known or hereafter developed. For example, as illustrated, in one embodiment, the spring tab latch 350 include a groove or recess 352 formed therein for receiving an end 364 of the spring latch 360 formed in the headrail coupling segment 330 of the bracket 300 (FIGS. 7 and 8). In use, movement of the spring tab latch 350 from the first position (FIG. 6A) to the second position (FIG. 6B), moves the end 364 of the spring latch 360 from a first position (FIG. 6A) to a second position (FIG. 6B), which causes the spring latch 360 to deflect, which enables the headrail 208 to be removed from the bracket 300.

As illustrated, in one embodiment, the spring tab latch 350 may be slidably movable from the first position (FIG. 6A) to the second position (FIG. 6B). For example, as illustrated, the bracket 300 such as, for example, the wall mounting segment 310 may include a pair of rails or guides 318 (FIG. 8) extending therefrom for slidably engaging the spring tab latch 350. In one embodiment, the rails or guides 318 may be formed, punched, etc. from the wall mounting segment 310.

Figure 9:
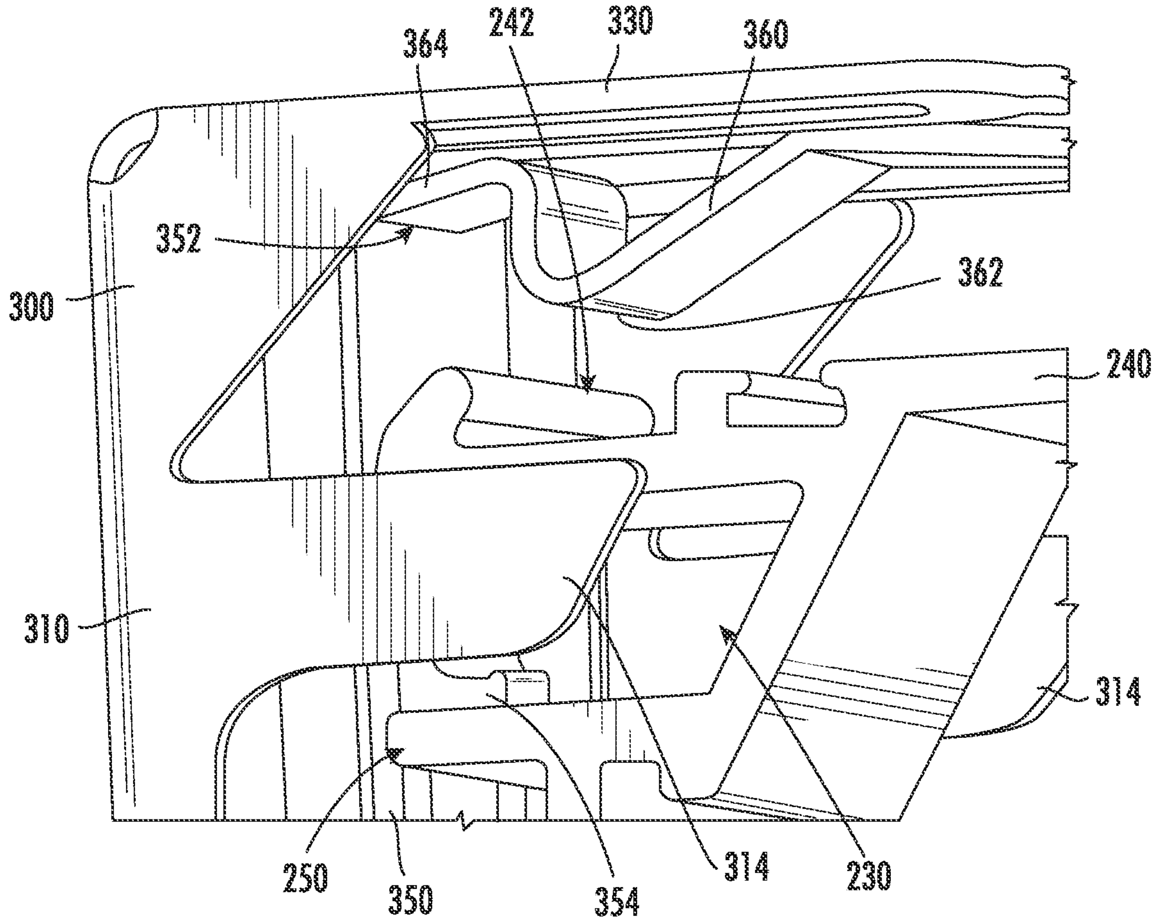
FIG. 9 illustrates a detailed perspective view of the coupling or bracket system shown in FIG. 3.
Figure 10:
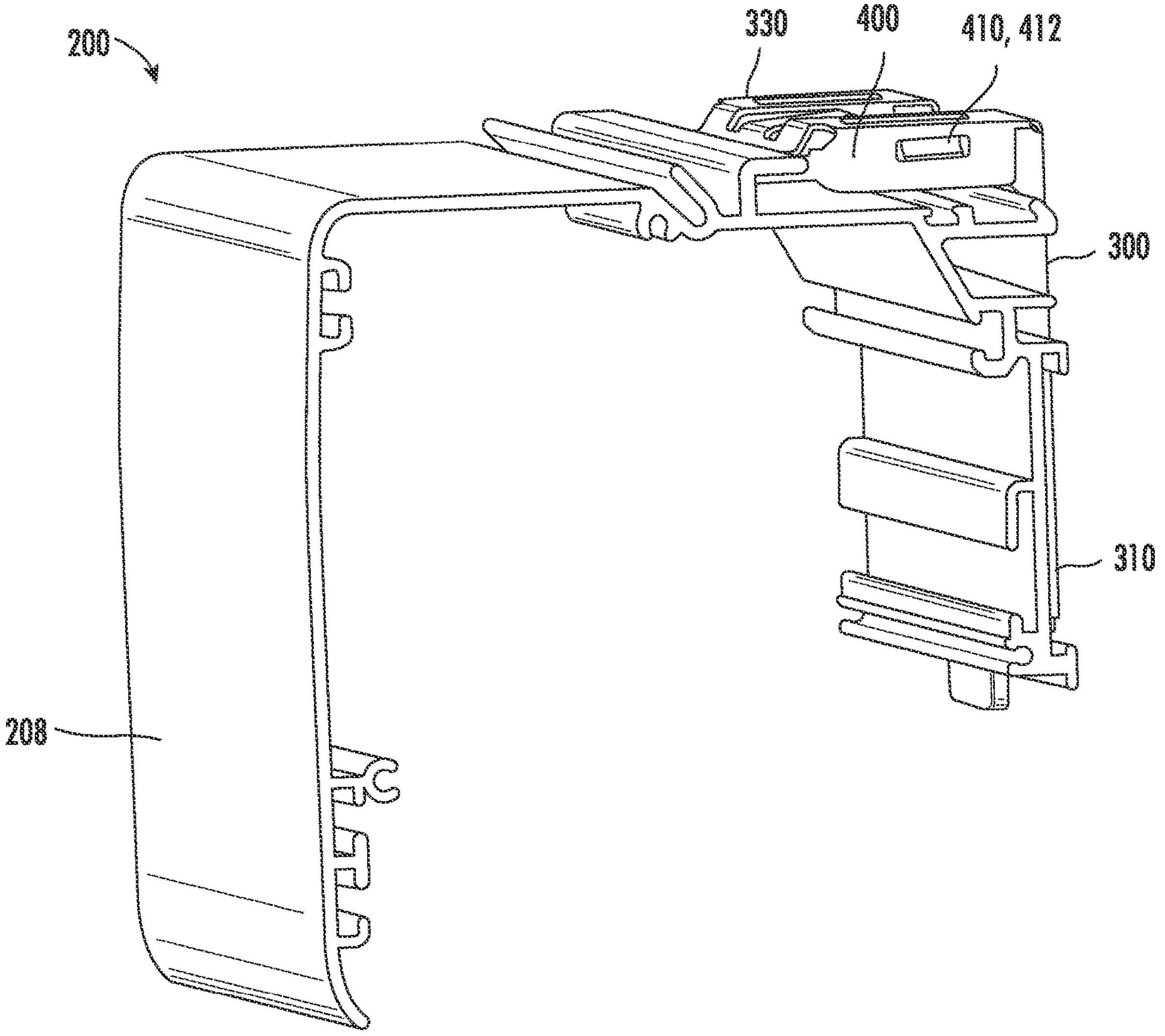
FIG. 10 illustrates a perspective view of an alternate embodiment of a coupling or bracket system for coupling a headrail, and hence an architectural-structure covering, to a wall of a user's building in accordance with one or more features of the present disclosure.
Figure 11:
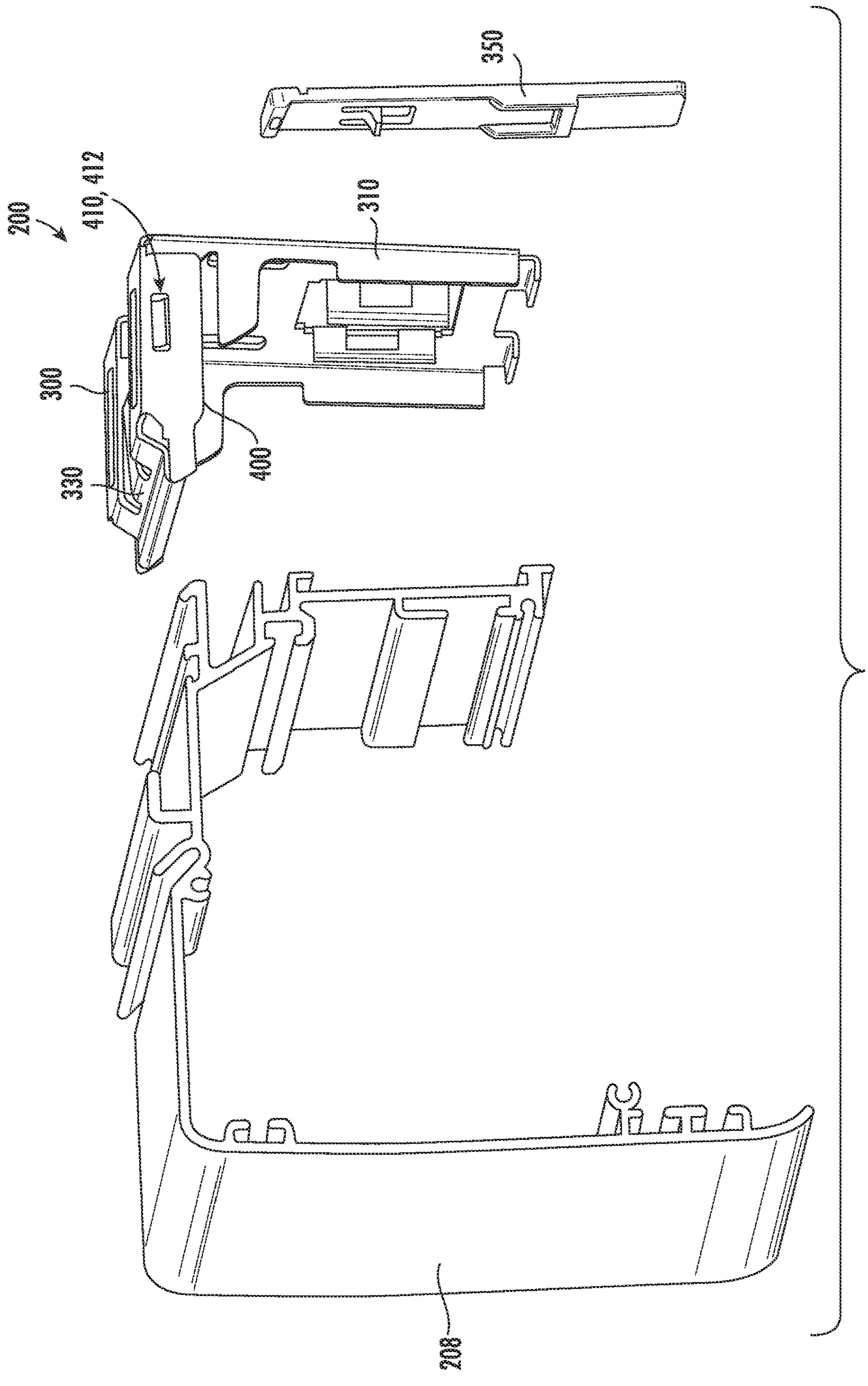
FIG. 11 illustrates an exploded perspective view of the coupling or bracket system shown in FIG. 10.
Figure 12A:
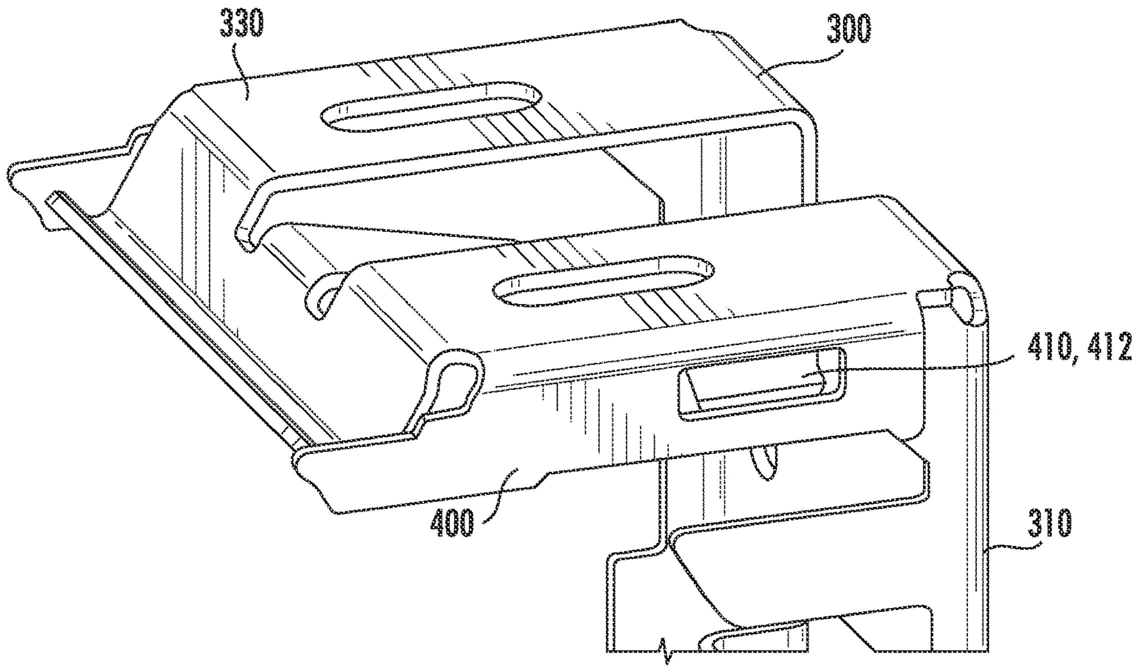
FIG. 12A illustrates a perspective view of an embodiment of a bracket used in connection with the coupling or bracket system shown in FIG. 10.
Figure 12B:
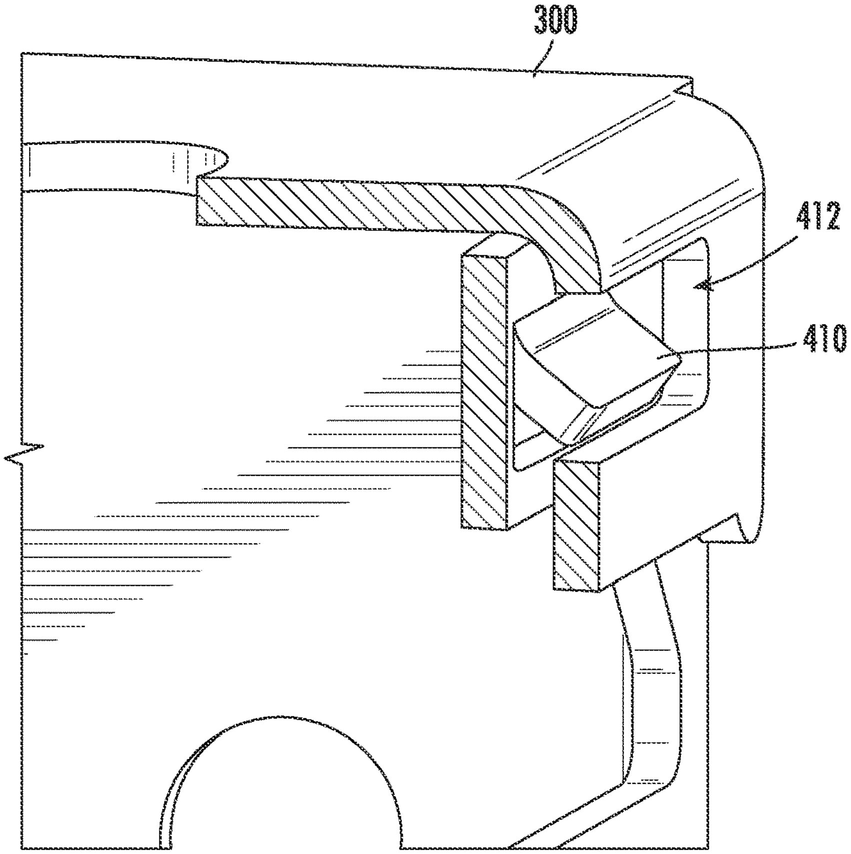
FIG. 12B illustrates a cross-sectional view of the bracket shown in FIG. 12A.

In addition, and/or alternatively, in accordance with one or more features of the present disclosure, the spring tab latch 350 may include a tab 354 extending therefrom. In use, and as best shown in FIGS. 6A and 9, the tab 354 is arranged and configured to interact with the second, rearwardly extending ledge or arm 250. The interaction of the tab 354 and the ledge 250 maintains the spring tab latch 350 in the second position (FIG. 6B) so that a user can selectively move the spring tab latch 350 in a first bracket 300 to the second position (FIG. 6B) and then go on to move the spring tab latch 350 in a second bracket 300 to the second position (FIG. 6B) without having to hold the spring tab latch 350 of the first bracket 300, which may be positioned a distance apart from the second bracket (e.g., the interaction of the tab 354 and the ledge 250 allows a user to disengage one bracket and not have to hold it "open" while the user moves to unlock a second bracket, a third bracket, and so-on). The tab 354 holds the bump 362 of the spring latch 360 out of the recess 242 of the first, rearwardly extending ledge or arm 240 on the headrail 208 until the headrail 208 is decoupled from the brackets 300.

In addition, and/or alternatively, in accordance with one or more features of the present disclosure, the headrail mounting segment 330 may include one or more assembly slots 334 (FIGS. 7 and 8) formed therein. In use, the assembly slots 334 may be arranged and configured to receive one or more fasteners for coupling a battery pack or other element to the brackets 300 without requiring the headrail 208 to be decoupled from the brackets 300.

Referring to FIGS. 10-12B, an alternate embodiment of a coupling or bracket system 200 in accordance with one or more features of the present disclosure is illustrated. In use, the coupling or bracket system 200 is substantially similar to the previously described coupling or bracket system 200 except for the differences described below. As such, for the sake of brevity, detailed discussion of the coupling or bracket system 200 is omitted herefrom.

Referring to FIGS. 10-12B, the bracket 300 includes a headrail coupling segment 330 extending from a wall mounting segment 310 as previously described. The headrail coupling segment 330 includes a vertical flange 400 positioned on either side thereof. In use, the vertical flange 400 is arranged and configured to provided added support to the bracket 200. In particular, the flanges 400 assist in preventing the bracket 200 from opening when under load. In use, the flanges 400 may be monolithically or integrally formed with the bracket 200, although it is envisioned that the flanges may be separately formed and coupled thereto. In use, the flanges 400 may be folded into position and coupled or secured in place. As illustrated, in one embodiment, the flanges 400 may be held in position by a projection, a louver, a barb, or the like 410 arranged and configured to engage a corresponding opening 412 formed in the flange 400, although the flange may be held in position by any other known or hereafter developed mechanisms.

The foregoing discussion has been presented for purposes of illustration and description and is not intended to limit the disclosure to the form or forms disclosed herein. For example, various features of the disclosure are grouped together in one or more embodiments or configurations for the purpose of streamlining the disclosure. However, it should be understood that various features of the certain embodiments or configurations of the disclosure may be combined in alternate embodiments or configurations. Moreover, the following claims are hereby incorporated into this Detailed Description by this reference, with each claim standing on its own as a separate embodiment of the present disclosure.

The term "substantially" or "approximate" as used herein is intended to cover minor deviations such as plus or minus 10%-dimensional variant.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof are open-ended expressions and can be used interchangeably herein.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary.

The invention claimed is:

1. A bracket arranged and configured to couple a headrail of an architectural-structure covering to a wall, the bracket comprising:

a wall mounting segment having a rear wall arranged and configured to contact the wall, the wall mounting segment including:

one or more shelves extending from the wall mounting segment, the one or more shelves being arranged and configured to be received within a pocket of the headrail to align and support the headrail to the bracket;

a headrail coupling segment extending from the wall mounting segment, the headrail coupling segment including:

a downwardly extending tab positioned at an end of the headrail coupling segment, the tab being arranged and configured to be received within an opening of the headrail; and a spring latch movable between a first position and a second position, in the first position, at least a portion of the spring latch is positioned within a recess of the headrail for securing the headrail to the bracket, in the second position, the portion of the spring latch is decoupled from the headrail so that the headrail can be removed from the bracket; and a spring tab latch moveable from a first position to a second position such that movement of the spring tab latch from the first position to the second position moves the spring latch from its first position to its second position;

wherein the one or more shelves and the tab are arranged and configured to be received within the pocket and the opening, respectively, in a single horizontal motion.

2. The bracket of claim 1, wherein the portion of the spring latch is a bump arranged and configured to reside within the recess, the recess formed in a first, rearwardly extending arm on the headrail.

3. The bracket of claim 1, wherein the bracket is monolithically formed with the headrail coupling segment extending at an approximate 90-degree angle relative to the wall mounting segment.

4. The bracket of claim 1, wherein the one or more shelves include first and second shelves.

5. The bracket of claim 1, wherein the spring tab latch further comprises a groove formed in a front surface thereof, the groove adapted and configured to receive an end portion of the spring latch.

6. The bracket of claim 1, wherein the spring latch is arranged and configured as a leaf-spring arranged and configured to flex between the first and second positions thereof.

7. The bracket of claim 1, wherein the spring tab latch is slidably movable from the first position to the second position.

8. The bracket of claim 7, wherein the wall mounting segment includes a pair of guides extending from a front surface thereof for slidably engaging the spring tab latch.

9. The bracket of claim 1, wherein the spring tab latch includes a tab extending from a front surface thereof, the tab being arranged and configured to maintain the spring tab latch in the second position.

10. The bracket of claim 9, wherein the tab extending from the spring tab latch is arranged and configured to interact with a second, rearwardly extending ledge of the headrail.

11. The bracket of claim 1, wherein the headrail mounting segment includes one or more assembly slots formed therein, the assembly slots being arranged and configured to receive one or more fasteners for coupling a battery pack to the bracket.

12. A coupling system arranged and configured to couple a headrail of an architectural-structure covering to a wall, the coupling system comprising:

a headrail comprising a rear surface, a front surface, and a top surface extending between the rear and front surfaces, the top surface of the headrail includes a first leg partially defining an opening, the rear surface including a pocket, and a first, rearwardly extending arm including a recess; and a bracket comprising:

a wall mounting segment having a rear wall arranged and configured to contact the wall, the wall mounting segment including:

one or more shelves extending from the wall mounting segment, the one or more shelves being arranged and configured to be received within the pocket of the headrail to align and support the headrail to the bracket;

a headrail coupling segment extending from the wall mounting segment, the headrail coupling segment including:

a downwardly extending tab positioned at an end of the headrail coupling segment, the tab being arranged and configured to be received within the opening of the headrail; and a spring latch movable between a first position and a second position, in the first position, at least a portion of the spring latch is positioned within the recess of the headrail for securing the headrail to the bracket, in the second position, the portion of the spring latch is decoupled from the headrail so that the headrail can be removed from the bracket; and a spring tab latch moveable from a first position to a second position such that movement of the spring tab latch from the first position to the second position moves the spring latch from its first position to its second position; and wherein the one or more shelves and the tab are arranged and configured to be received within the pocket and the opening, respectively, in a single horizontal motion.

13. The coupling system of claim 12, wherein the portion of the spring latch is a bump arranged and configured to reside within the recess.

14. The coupling system of claim 12, wherein the bracket is monolithically formed with the headrail coupling segment extending at an approximate 90-degree angle relative to the wall mounting segment.

15. The coupling system of claim 12, wherein the one or more shelves include first and second shelves.

16. The coupling system of claim 12, wherein the spring tab latch further comprises a groove formed in a front surface thereof, the groove adapted and configured to receive an end portion of the spring latch.

17. The coupling system of claim 12, wherein the spring latch is arranged and configured as a leaf-spring arranged and configured to flex between the first and second positions thereof.

18. The coupling system of claim 12, wherein the spring tab latch is slidably movable from the first position to the second position.

19. The coupling system of claim 18, wherein the wall mounting segment includes a pair of guides extending from a front surface thereof for slidably engaging the spring tab latch.

20. The coupling system of claim 12, wherein the spring tab latch includes a tab extending from a front surface thereof, the tab being arranged and configured to maintain the spring tab latch in the second position.

21. The coupling system of claim 20, wherein the headrail includes a second, rearwardly extending ledge, the tab extending from the spring tab latch is arranged and configured to interact with the second, rearwardly extending ledge of the headrail.

22. The coupling system of claim 12, wherein the headrail mounting segment includes one or more assembly slots formed therein, the assembly slots being arranged and configured to receive one or more fasteners for coupling a battery pack to the bracket.

23. The coupling system of claim 12, wherein the first leg includes a first leg segment extending from the top surface of the headrail and a second leg segment extending from the first leg segment, the second leg segment and the top surface of the headrail defining the opening.

24. The coupling system of claim 23, wherein the second leg segment extends at an approximate 90-degree angle relative to the first leg segment so that the second leg segment extends substantially parallel to the top surface of the headrail.

* * * * *